US012674493B1

(12) United States Patent
Landry-Drolet et al.

(10) Patent No.: US 12,674,493 B1
(45) Date of Patent: Jul. 7, 2026

(54) SPRAG CLUTCH ASSEMBLY OF GAS TURBINE ENGINE

(71) Applicant: Pratt & Whitney Canada Corp., Longueuil (CA)

(72) Inventors: Guillaume Landry-Drolet, Boucherville (CA); Michel Abdelnour, Greenfield Park (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/296,527

(22) Filed: Aug. 11, 2025

(51) Int. Cl.
  *F16D 41/07* (2006.01)
  *B64D 35/00* (2006.01)

(52) U.S. Cl.
  CPC .............. *F16D 41/07* (2013.01); *B64D 35/00* (2013.01)

(58) Field of Classification Search
  CPC ................................ B64D 35/00; F16D 41/07
  See application file for complete search history.

(56) References Cited

U.S. PATENT DOCUMENTS

| | | | |
|---|---|---|---|
| 4,756,395 A | | 7/1988 | Zlotek |
| 5,671,836 A | * | 9/1997 | Shirataki ................. F16D 41/07 |
| | | | 192/113.32 |
| 12,281,679 B2 | | 4/2025 | Gmirya |
| 2018/0259011 A1 | | 9/2018 | Fukami |
| 2022/0010848 A1 | * | 1/2022 | Morales ............... F16D 41/076 |
| 2025/0180079 A1 | * | 6/2025 | Morita ................... F16D 41/07 |

* cited by examiner

*Primary Examiner* — Lori Wu
(74) *Attorney, Agent, or Firm* — Getz Balich LLC

(57) ABSTRACT

A clutch assembly is provided that includes inner and outer races. The clutch assembly also includes sprags concentrically disposed in an annular space between the inner and outer races. Each sprag includes an inner step and an outer step. The clutch assembly further includes a segmented ring configured to radially expand and radially contract. The clutch assembly also includes a resilient element configured to exert a force on the segmented ring and affect expansion or contraction of the segmented ring. In a disengaged state, the segmented ring is configured to contract to exert a radially inward pressure on the inner step of each sprag to create a gap between each sprag and the outer race. In an engaged state, the segmented ring is configured to expand to exert radially outward pressure on the outer step of each sprag to wedge each sprag between the inner and outer races.

20 Claims, 5 Drawing Sheets

SPRAG CLUTCH ASSEMBLY OF GAS TURBINE ENGINE

TECHNICAL FIELD

This disclosure relates generally to propulsion systems for aircraft and, more particularly, to a sprag clutch assembly for a propulsion system drivetrain.

BACKGROUND OF THE ART

Propulsion systems for aircraft may typically include a gas turbine engine utilizing sprag clutch assemblies. Various sprag clutch assemblies are known in the art. While these known sprag clutch assemblies may be suitable for their intended purposes, there is always room in the art for improvement.

SUMMARY

According to an aspect of the present disclosure, a clutch assembly is provided that includes an inner race having an outer surface, and an outer race disposed concentrically around the inner race. The outer race has an inner surface. The clutch assembly also includes a plurality of sprags circumferentially disposed in an annular space between the outer surface of the inner race and the inner surface of the outer race. Each of the plurality of sprags includes a radially inner step and a radially outer step. The clutch assembly further includes a segmented ring disposed circumferentially around the outer surface of the inner race. The segmented ring is configured to radially expand for engagement with the radially outer step of each of the plurality of sprags and radially contract for engagement with the radially inner step of each of the plurality of sprags. The clutch assembly also includes a resilient element configured to exert a force on the segmented ring and affect at least one of radial expansion or radial contraction of the segmented ring. In a disengaged state of the clutch assembly, the segmented ring is configured to radially contract to exert a radially inward pressure on the radially inner step of each of the plurality of sprags to create a gap between each of the plurality of sprags and the inner surface of the outer race. In an engaged state of the clutch assembly, the segmented ring is configured to radially expand to exert radially outward pressure on the radially outer step of each of the plurality of sprags to wedge each sprag between the outer surface of the inner race and the inner surface of the outer race.

In any of the aspects or embodiments described above and herein, in the disengaged state, the radially inward pressure on the radially inner step may pivot each of the plurality of sprags about an inner pivot point.

In any of the aspects or embodiments described above and herein, in the engaged state, the radially outward pressure on the radially outer step may pivot each of the plurality of sprags about an outer pivot point.

In any of the aspects or embodiments described above and herein, the resilient element may be configured to exert a radially inward force on the segmented ring.

In any of the aspects or embodiments described above and herein, in the engaged state, a centrifugal force may radially expand the segmented ring, and the centrifugal force may exceed the radially inward force of the resilient element.

In any of the aspects or embodiments described above and herein, in the engaged state, a pressure-actuated system may radially expand the segmented ring, and a radially outward force from the pressure-actuated actuation system may exceed the radially inward force of the resilient element.

In any of the aspects or embodiments described above and herein, the pressure-actuated system may include at least one piston configured to exert the radially outward force on the segmented ring.

In any of the aspects or embodiments described above and herein, the segmented ring may be divided into a plurality of arc-shaped segments.

In any of the aspects or embodiments described above and herein, in the engaged state, torque may be transmitted from the inner race to the outer race via a contact line of each of the plurality of sprags between the outer surface of the inner race and the inner surface of the outer race.

In any of the aspects or embodiments described above and herein, the radially inner step and the radially outer step may extend axially from a face of each of the plurality of sprags.

According to an aspect of the present disclosure, a clutch assembly is provided that includes an inner race, an outer race disposed concentrically around the inner race, and a plurality of sprags circumferentially disposed in an annular space between the inner race and the outer race. The clutch assembly also includes a segmented ring disposed circumferentially around the inner race. The segmented ring is configured to radially expand and radially contract for engagement with the plurality of sprags. The clutch assembly further includes a resilient element configured to exert a force on the segmented ring and affect at least one of radial expansion or radial contraction of the segmented ring. In a disengaged state of the clutch assembly, radial contraction of the segmented ring pivots each of the plurality of sprags such that a gap is disposed between each of the plurality of sprags and the outer race. In an engaged state of the clutch assembly, radial expansion of the segmented ring pivots each of the plurality of sprags to form a contact line between the inner race and the outer race. Torque is transmitted via the contact line.

In any of the aspects or embodiments described above and herein, each of the plurality of sprags may include a radially inner step and a radially outer step.

In any of the aspects or embodiments described above and herein, the radially inner step and the radially outer step may extend axially from a face of each of the plurality of sprags.

In any of the aspects or embodiments described above and herein, in the disengaged state, the segmented ring may apply a radially inward pressure on the radially inner step.

In any of the aspects or embodiments described above and herein, in the engaged state, the segmented ring may apply a radially outward pressure on the radially outer step.

In any of the aspects or embodiments described above and herein, the resilient element may be configured to exert a radially inward force on the segmented ring.

In any of the aspects or embodiments described above and herein, in the engaged state, a centrifugal force may radially expand the segmented ring, and the centrifugal force may exceed the radially inward force of the resilient element.

In any of the aspects or embodiments described above and herein, in the engaged state, a pressure-actuated system may radially expand the segmented ring, and the pressure-actuated system may be configured to exert a radially outward force on the segmented ring that exceeds the radially inward force of the resilient element.

In any of the aspects or embodiments described above and herein, the segmented ring may be divided into a plurality of arc-shaped segments.

According to an aspect of the present disclosure, a clutch assembly is provided that includes an inner race, an outer race disposed concentrically around the inner race, and a plurality of sprags circumferentially disposed in an annular space between the inner race and the outer race. Each of the plurality of sprags includes a radially inner step and a radially outer step. The clutch assembly also includes a segmented ring disposed circumferentially around the inner race. The segmented ring is configured to radially expand for engagement with the radially outer step of each of the plurality of sprags and radially contract for engagement with the radially inner step of each of the plurality of sprags. In a disengaged state of the clutch assembly, the segmented ring radially contracts to exert a radially inward pressure on the inner step of each of the plurality of sprags and pivots each of the plurality of sprags to create a gap between each of the plurality of sprags and the outer race. In an engaged state of the clutch assembly, the segmented ring radially expands to exert radially outward pressure on the outer step of each of the plurality of sprags and pivots each of the plurality of sprags to wedge each of the plurality of sprags between the inner race and the outer race.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
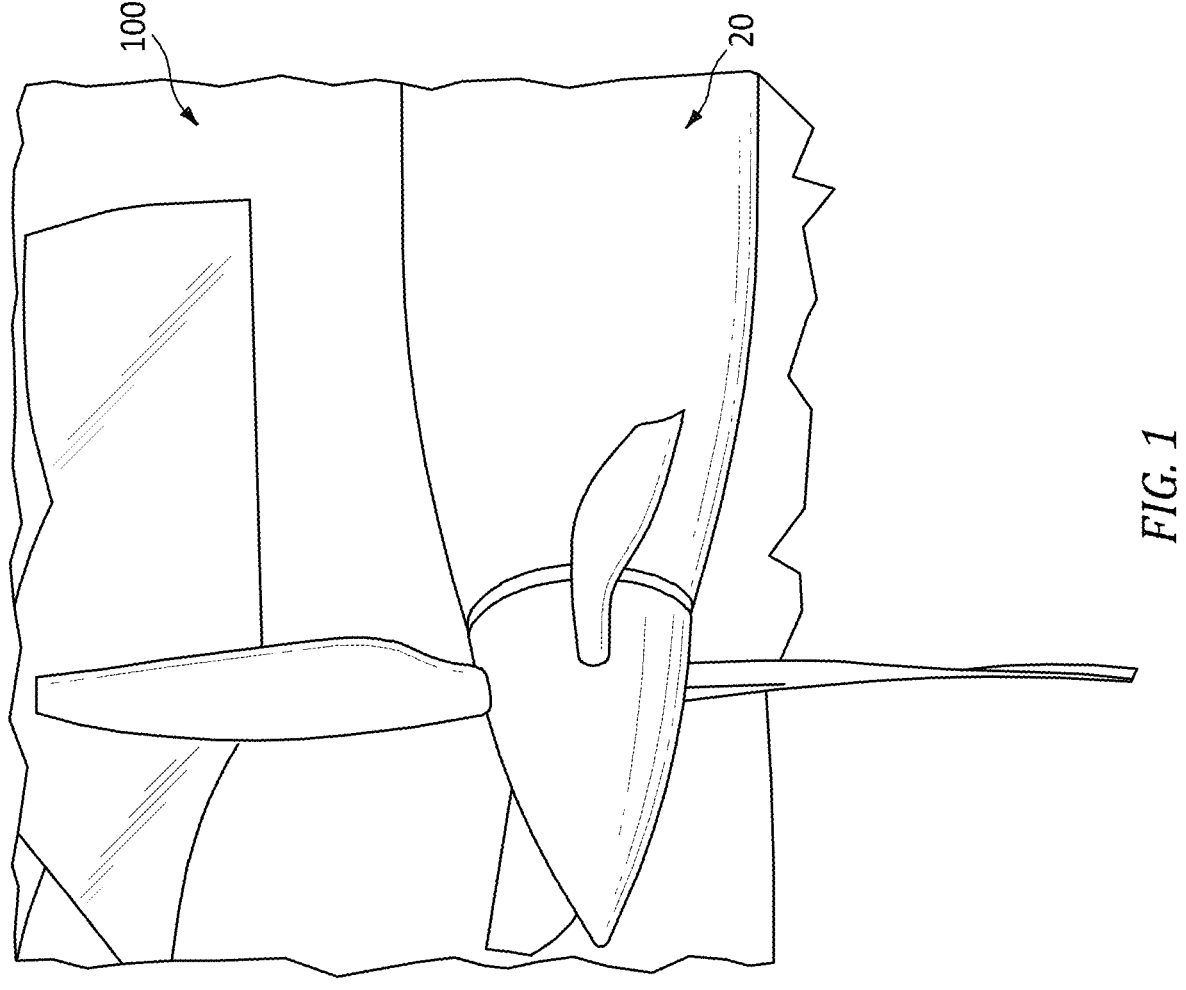
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
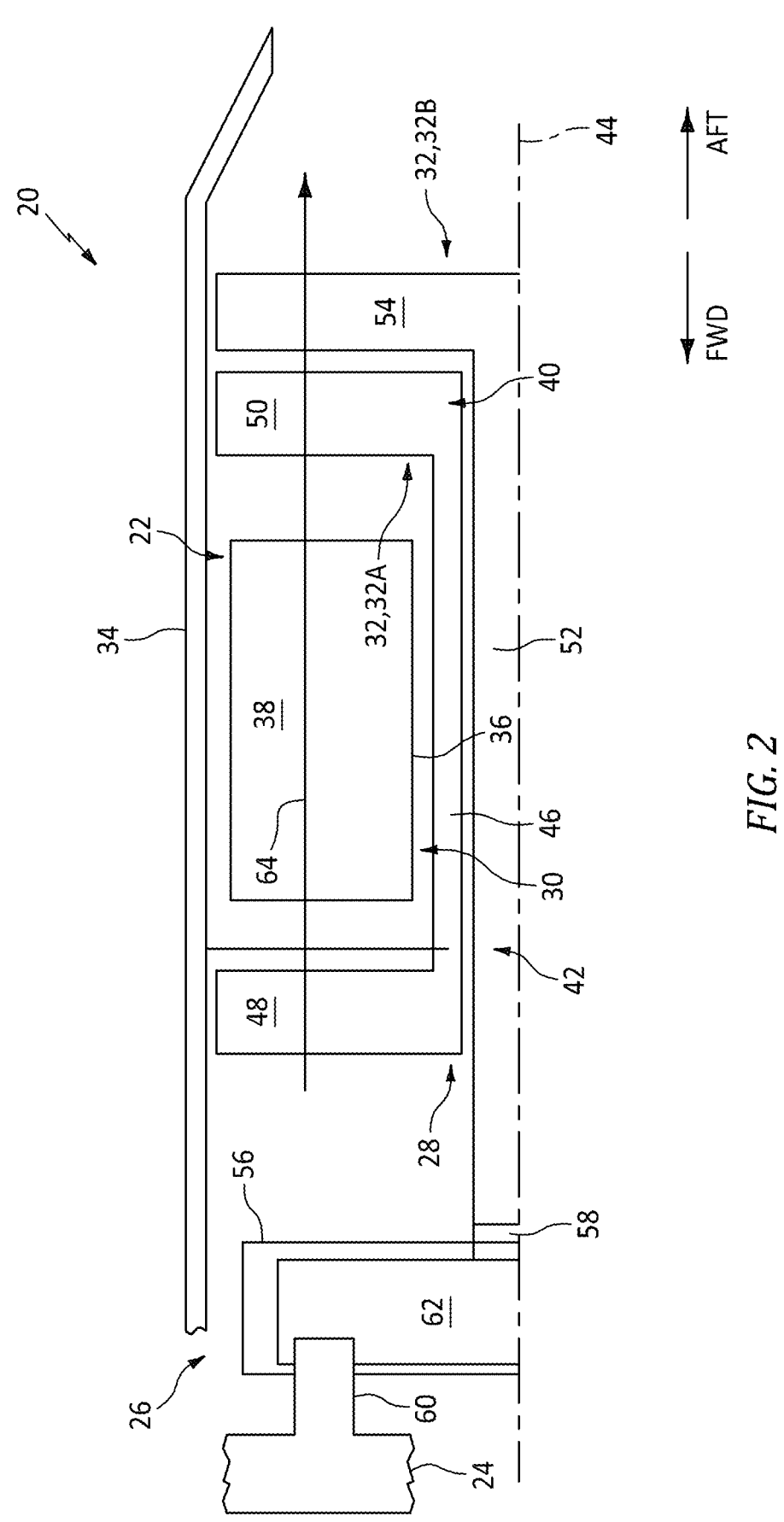
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, a propulsor 24, and a drivetrain 26.

The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, or other intermittent combustion engines.

The engine 22 of FIG. 2 includes a compressor section 28, a combustor section 30, a turbine section 32, and an engine static structure 34. The combustor section 30 includes a combustor 36 (e.g., an annular combustor) forming a combustion chamber 38. The turbine section 32 includes a high-pressure turbine 32A and a power turbine 32B.

Components of the compressor section 28 and/or the turbine section 32 of FIG. 2 form a first rotational assembly 40 (e.g., a high-pressure spool) and a second rotational assembly 42 of the engine 22. The first rotational assembly 40 and the second rotational assembly 42 are mounted for rotation about an axial centerline 44 (e.g., a rotational axis) of the engine 22 relative to the engine static structure 34.

The first rotational assembly 40 includes a first shaft 46, a bladed compressor rotor 48 for the compressor section 28, and a bladed first turbine rotor 50 for the high-pressure turbine 32A. The first shaft 46 interconnects the bladed compressor rotor 48 and the bladed first turbine rotor 50.

The second rotational assembly 42 of FIG. 2 includes a second shaft 52 (e.g., an engine output shaft or power turbine shaft) and a bladed second turbine rotor 54 for the power turbine 32B. The second shaft 52 is connected to the bladed second turbine rotor 54. The second shaft 52 is coupled to the propulsor 24 by the drivetrain 26.

The drivetrain 26 includes a gearbox 56 (e.g., a reduction gearbox (RGB)), a first input shaft 58, and an output shaft 60 (e.g., a propulsor output shaft or a propeller shaft). The gearbox 56 includes and houses a gear assembly 62. The gear assembly 62 couples the first input shaft 58 with the output shaft 60. For example, the gear assembly 62 may be a reduction gear assembly configured to drive rotation of the output shaft 60 at a reduced rotational speed relative to the first input shaft 58. The first input shaft 58 is coupled to (e.g., mounted on) the second shaft 52, and interconnects the second shaft 52 with the gear assembly 62. As an alternative, the second shaft 52 may directly connect with the gear assembly 62 without the first input shaft 58 therebetween. The output shaft 60 is coupled to (e.g., mounted on) the propulsor 24, and interconnects the propulsor 24 with the gear assembly 62.

The engine static structure 34 includes engine casings, cowlings, and other fixed (e.g., non-rotating) structures of the engine 22 which form, house, and/or support components of the engine 22 such as, but not limited to, those of the compressor section 28, the combustor section 30, and the turbine section 32. The engine static structure 34 may include one or more bearing assemblies configured to rotationally support components of the first rotational assembly 40 and the second rotational assembly 42.

During operation of the propulsion system 20 of FIG. 2, ambient air enters the propulsion system 20 (e.g., through an air intake) and is directed through the engine 22 along a core gas flow path 64. The ambient air flow along the core gas flow path 64 is compressed in the compressor section 28 by rotation of the bladed compressor rotor 48, and directed into the combustor 36 (e.g., the combustion chamber 38). Fuel is injected into the combustion chamber 38 and mixed with the compressed air to provide a fuel-air mixture. This fuel-air mixture is ignited, and combustion products thereof flow through the high-pressure turbine 32A and the power turbine 32B and are exhausted from the propulsion system 20. The bladed first turbine rotor 50 and the bladed second turbine rotor 54 rotationally drive the first rotational assembly 40 and the second rotational assembly 42, respectively, in response to the combustion gas flow through the high-pressure turbine 32A and the power turbine 32B along the core gas flow path 64. The second rotational assembly 42 (e.g., the second shaft 52) drives rotation of the propulsor 24 through the drivetrain 26.

A sprag clutch is a torque transfer device that may be utilized in the drivetrain 26 of FIG. 2. For example, a sprag clutch may be disposed in the gearbox 56 to enable coupling/decoupling of drive gears. A sprag clutch includes wedge-shaped sprags circumferentially arranged between a rotatable inner race and a rotatable outer race. In an exemplary configuration, when the inner race reaches the same rotational speed as the outer race, the sprags are wedged between the inner race and the outer race, allowing for torque transfer between the races. Conversely, when the outer race rotates at a higher speed than the inner race, the sprag clutch is disengaged (i.e., the outer race is overrunning), allowing freewheeling of the races without torque transmission. Sprag clutches may suffer from continuous frictional contact and wear between the sprags and the races, even in a disengaged state. Over time, this wear may degrade clutch performance, increase backlash, and necessitate premature maintenance or replacement.

Embodiments of the present disclosure provide an apparatus that disengages the sprags to eliminate frictional contact during overrunning, and reliably re-engages the sprags to transfer torque when required, without introducing undue complexity.

Figure 3:
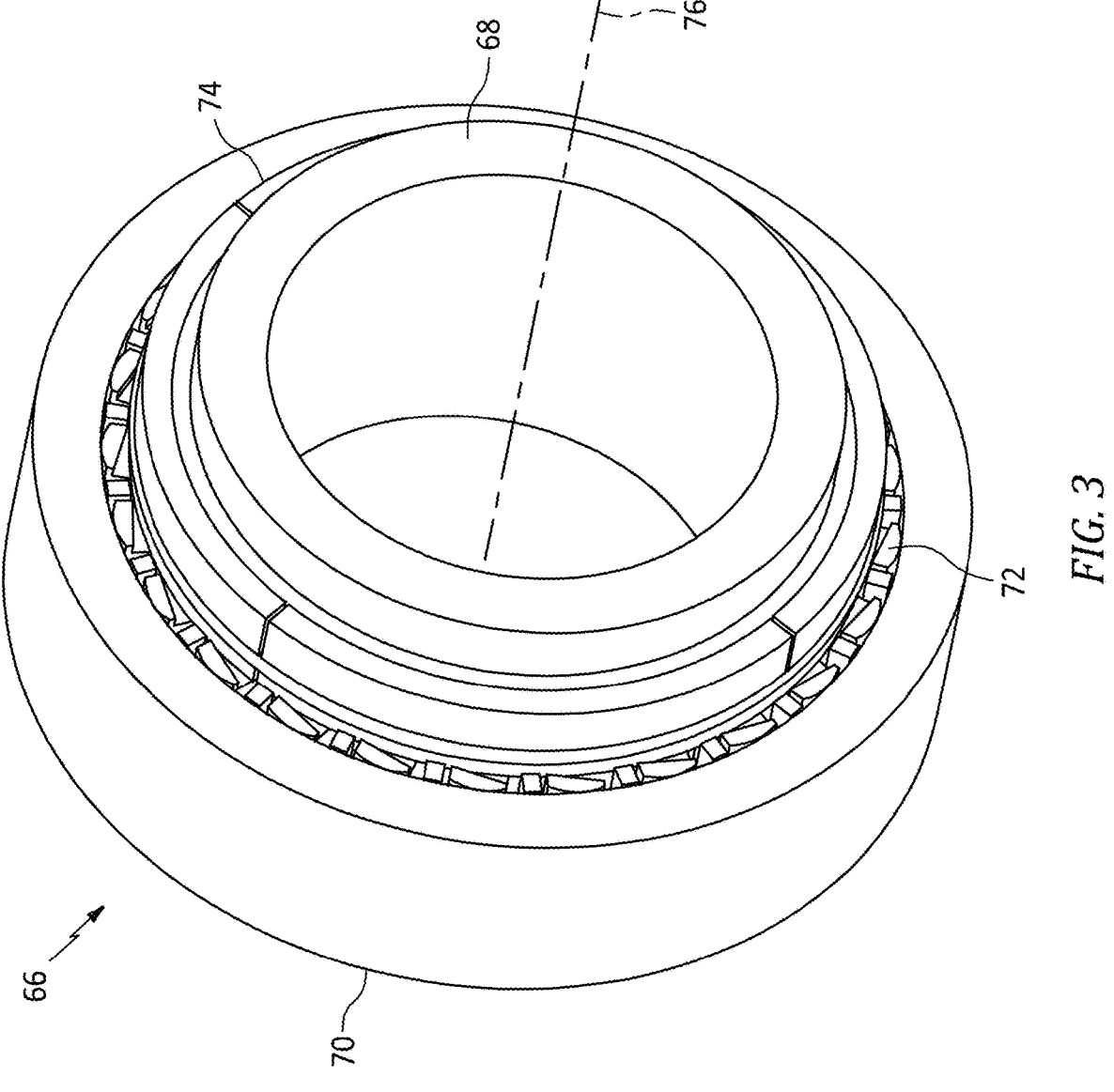
FIG. 3 schematically illustrates a perspective view of a sprag clutch assembly, in accordance with one or more embodiments of the present disclosure.

FIG. 3 schematically illustrates a perspective view of a sprag clutch assembly 66 having an inner race 68, an outer race 70, sprags 72, and a segmented ring 74. The inner race 68 is disposed concentrically within the outer race 70, and both the inner race 68 and the outer race 70 are disposed circumferentially about a central axis 76. The inner race 68 and the outer race 70 may be stationary or rotating. The present disclosure is not limited to any particular size or shape of the inner race 68 and the outer race 70. The sprags 72 are arranged circumferentially within an annular space between the inner race 68 and the outer race 70. Specifically, the sprags are arranged circumferentially outside of the inner race 68 and circumferentially within the outer race 70. Each sprag 72 is configured to pivot for engagement/disengagement of the sprag clutch assembly 66. The present disclosure is not limited to any particular number, arrangement, size, or shape of the sprags 72.

The segmented ring 74 is also disposed circumferentially between the inner race 68 and the outer race 70, and circumferentially about the central axis 76. Specifically, the segmented ring 74 may be disposed circumferentially outside of the inner race 68, and at least partially circumferentially within the outer race 70. The segmented ring 74 is configured with individual arc-shaped segments such that the segmented ring 74 may radially expand and contract (e.g., outwardly displaced and inwardly displaced). The present disclosure is not limited to any particular size or shape of the segmented ring 74, or number, arrangement, or size of the individual arc-shaped segments. The segmented ring 74 engages the sprags 72 such that sufficient radial expansion of the segmented ring 74 pivots the sprags 72, allowing the sprags 72 to wedge for engagement of the sprag clutch assembly 66, and sufficient radial contraction of the segmented ring 74 pivots the sprags 72 for disengagement of the sprag clutch assembly 66.

A resilient element 94 (see FIG. 6) may continuously exert a radially inward force on the segmented ring 74, thereby maintaining the sprag clutch assembly 66 in a disengaged state when no other radially outward forces exceed the radially inward force. As an alternative, the resilient element 94 may continuously exert a radially outward force on the segmented ring 74, thereby maintaining the sprag clutch assembly 66 in an engaged state when no other radially inward forces exceed the radially outward force.

The term "resilient element", as used herein, refers to any component that applies a biasing or restoring force via reversible deformation or compression between two members, including, without limitation, coil springs, disc springs, wave washers, elastomeric blocks, shape-memory alloy elements, pneumatic springs, hydraulic accumulators, or other compliant members. Such a resilient element may be characterized by a spring rate, which is the amount of force required to compress the resilient element a predetermined distance. It may be assumed, but not required, that the spring rate is linear. The biasing or restoring force produced by the resilient element is a function of the amount of compression.

Figures 4, 5:
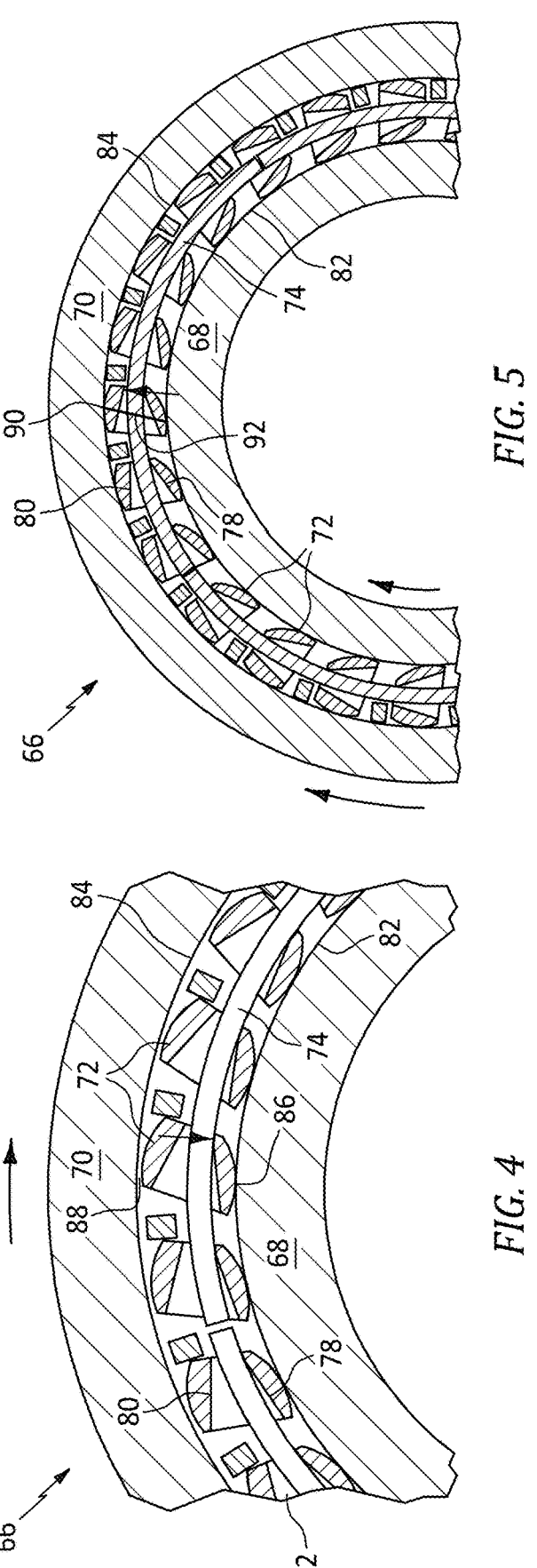
FIG. 4 schematically illustrates a partial, axial cross-sectional view of a disengaged sprag clutch assembly, in accordance with one or more embodiments of the present disclosure.
FIG. 5 schematically illustrates a partial, axial cross-sectional view of an engaged sprag clutch assembly, in accordance with one or more embodiments of the present disclosure.

FIG. 4 schematically illustrates a partial, axial cross-sectional view of the sprag clutch assembly 66 in a disengaged state. For example, in the disengaged state, the outer race 70 may rotate faster than the inner race 68 (or vice versa), and the inner race 68 does not transfer torque to the outer race 70. Each sprag 72 includes a radially inner step 78 and a radially outer step 80 extending axially from a face the sprag 72 for engagement with the segmented ring 74. The radially inner step 78 is disposed radially inward of the radially outer step 80. Specifically, the radially inner step 78 is disposed closer to an outer surface 82 the inner race 68 and the radially outer step 80 is disposed closer to an inner surface 84 of the outer race 70. At least a portion of the segmented ring 74 is disposed between the radially inner step 78 and the radially outer step 80.

In the disengaged state, the force of the resilient element 94 radially contracts the segmented ring 74 such that a surface of the segmented ring 74 contacts and exerts pressure on the radially inner step 78 of each sprag 72. The radially inner step 78 is oriented such that pressure exerted on the radially inner step 78 pivots each sprag 72 about an inner pivot point 86, moving the most radially outward surface of the sprag 72 radially inward. The radially inward movement of each sprag surface creates a gap 88 between each sprag 72 and an inner surface of the outer race 70. With no contact between the sprags 72 and the outer race 70, friction and wear are prevented in the disengaged state of the sprag clutch assembly 66 and during overrunning. The present disclosure is not limited to any particular arrangement, orientation, size, or shape of the radially inner step 78.

FIG. 5 schematically illustrates a partial, axial cross-sectional view of the sprag clutch assembly 66 in an engaged state. For example, the outer race 70 may be overrunning or static, and the inner race 68 may begin to rotate. As the speed of the inner race 68 increases, a centrifugal force acting on a mass of the segmented ring 74 also increases. When this centrifugal force exceeds the force exerted by the resilient element 94 on the segmented ring 74, the segmented ring 74 radially expands and exerts pressure on the radially outer step 80 of each sprag 72. The radially outer step 80 is oriented such that pressure exerted on the radially outer step 80 pivots each sprag 72 about an outer pivot point 90, wedging the sprag 72 and creating a contact line 92 between the outer surface 82 of the inner race 68 and the inner surface 84 of the outer race 70. Engagement may occur when the relative speeds of the inner race 68 and the outer race 70 converge. Thereafter, torque is transmitted from the inner race 68 to the outer race 70 through the contact line 92 of each sprag 72, until disengagement of the sprag clutch assembly 66 via radially inward pressure on the segmented ring 74, as described above with respect to FIG. 4. The present disclosure is not limited to any particular arrangement, orientation, size, or shape of the radially outer step 80.

Alternative geometries of sprag steps, pivot points, and race profiles may be employed to optimize contact pressure. For example, the relative orientation of the radially inner step 78 and the radially outer step 80 may be reversed or offset to accommodate counter-clockwise rotation or over-running by the inner race 68.

Figure 6:
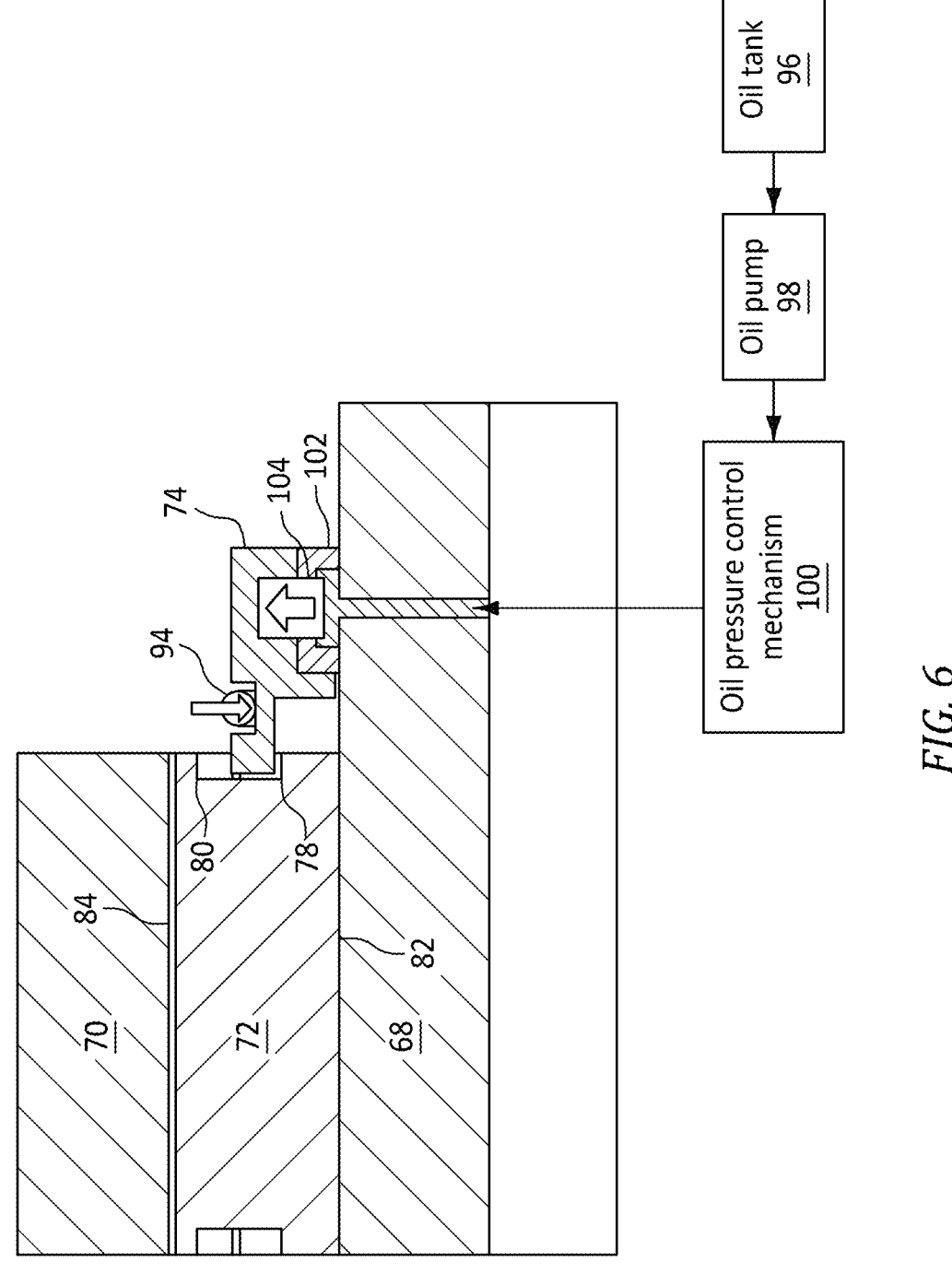
FIG. 6 schematically illustrates a partial, radial cross-sectional view of the sprag clutch assembly, in accordance with one or more embodiments of the present disclosure.

FIG. 6 schematically illustrates a partial, radial cross-sectional view of the sprag clutch assembly 66. The segmented ring 74 is disposed on the outer surface 82 of the inner race 68 and is subjected to a radially inward force from the resilient element 94. As described above with respect to FIG. 4, for disengagement of the sprag clutch assembly 66, the radially inward force of the resilient element 94 exceeds all radially outward forces and radially contracts the segmented ring 74, such that radially inward pressure is placed on the radially inner step 78 of the sprag 72, pivoting the sprag 72 to create the gap 88. As described above with respect to FIG. 5, for engagement of the sprag clutch assembly 66, a radially outward force exceeds the radially inward force of the resilient element 94 and radially expands the segmented ring 74 such that radially outward pressure is placed on the radially outer step 80 of the sprag 72, pivoting the sprag 72 to wedge between the outer surface 82 of the inner race 68 and the inner surface 84 of the outer race 70. As described in FIG. 5, the radially outward force may be centrifugal force. However, the present disclosure is not limited to any particular type of radially inward force or radially outward force.

As an alternative, for actuated engagement of the sprag clutch assembly 66, a pressure-actuated system may be employed. For example, in an oil-pressure actuation system, an oil tank 96 may provide oil to an oil pump 98, which provides pressurized oil through a valve or pressure control mechanism 100 and into an oil transfer sleeve 102 that encircles the inner race 68. The fluid pressure may be communicated to the segmented ring 74 directly or via a piston 104, which creates the radially outward force on the segmented ring 74. This radially outward force exceeds the radially inward force of the resilient element 94 for engagement of the sprag clutch assembly 66. When oil pressure is below the radially inward pressure of the resilient element 94, the resilient element 94 returns the segmented ring 74 to the radially inner step 78, reestablishing the disengaged state of the sprag clutch assembly 66. The present disclosure is not limited to any particular type or arrangement of the pressure-actuated system. For example, the pressure-actuated system may be embodied as a hydraulic system or a pneumatic system. Additionally, multiple independent hydraulic or pneumatic circuits or electronically controlled valves may be substituted for the pressure control mechanism 100 to modulate engagement timing and/or force.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A clutch assembly comprising:

an inner race having an outer surface;

an outer race disposed concentrically around the inner race, the outer race having an inner surface;

a plurality of sprags circumferentially disposed in an annular space between the outer surface of the inner race and the inner surface of the outer race, each of the plurality of sprags comprising a radially inner step and a radially outer step;

a segmented ring disposed circumferentially around the outer surface of the inner race, wherein the segmented ring is configured to radially expand for engagement with the radially outer step of each of the plurality of sprags and radially contract for engagement with the radially inner step of each of the plurality of sprags; and a resilient element configured to exert a force on the segmented ring and affect at least one of radial expansion or radial contraction of the segmented ring, wherein, in a disengaged state of the clutch assembly, the segmented ring is configured to radially contract to exert a radially inward pressure on the radially inner step of each of the plurality of sprags to create a gap between each of the plurality of sprags and the inner surface of the outer race, and wherein, in an engaged state of the clutch assembly, the segmented ring is configured to radially expand to exert radially outward pressure on the radially outer step of each of the plurality of sprags to wedge each sprag between the outer surface of the inner race and the inner surface of the outer race.

2. The clutch assembly of claim 1, wherein, in the disengaged state, the radially inward pressure on the radially inner step pivots each of the plurality of sprags about an inner pivot point.

3. The clutch assembly of claim 1, wherein, in the engaged state, the radially outward pressure on the radially outer step pivots each of the plurality of sprags about an outer pivot point.

4. The clutch assembly of claim 1, wherein the resilient element is configured to exert a radially inward force on the segmented ring.

5. The clutch assembly of claim 4, wherein, in the engaged state, a centrifugal force radially expands the segmented ring, and the centrifugal force exceeds the radially inward force of the resilient element.

6. The clutch assembly of claim 4, wherein, in the engaged state, a pressure-actuated system radially expands the segmented ring, and a radially outward force from the pressure-actuated actuation system exceeds the radially inward force of the resilient element.

7. The clutch assembly of claim 6, wherein the pressure-actuated system comprises at least one piston configured to exert the radially outward force on the segmented ring.

8. The clutch assembly of claim 1, wherein the segmented ring is divided into a plurality of arc-shaped segments.

9. The clutch assembly of claim 1, wherein, in the engaged state, torque is transmitted from the inner race to the outer race via a contact line of each of the plurality of sprags between the outer surface of the inner race and the inner surface of the outer race.

10. The clutch assembly of claim 1, wherein the radially inner step and the radially outer step extend axially from a face of each of the plurality of sprags.

11. A clutch assembly comprising:

an inner race;

an outer race disposed concentrically around the inner race;

a plurality of sprags circumferentially disposed in an annular space between the inner race and the outer race;

a segmented ring disposed circumferentially around the inner race, wherein the segmented ring is configured to radially expand and radially contract for engagement with the plurality of sprags; and a resilient element configured to exert a force on the segmented ring and affect at least one of radial expansion or radial contraction of the segmented ring, wherein, in a disengaged state of the clutch assembly, radial contraction of the segmented ring pivots each of the plurality of sprags such that a gap is disposed between each of the plurality of sprags and the outer race, and wherein, in an engaged state of the clutch assembly, radial expansion of the segmented ring pivots each of the plurality of sprags to form a contact line between the inner race and the outer race, and wherein torque is transmitted via the contact line.

12. The clutch assembly of claim 11, wherein each of the plurality of sprags comprises a radially inner step and a radially outer step.

13. The clutch assembly of claim 12, wherein the radially inner step and the radially outer step extend axially from a face of each of the plurality of sprags.

14. The clutch assembly of claim 12, wherein, in the disengaged state, the segmented ring applies a radially inward pressure on the radially inner step.

15. The clutch assembly of claim 12, wherein, in the engaged state, the segmented ring applies a radially outward pressure on the radially outer step.

16. The clutch assembly of claim 11, wherein the resilient element is configured to exert a radially inward force on the segmented ring.

17. The clutch assembly of claim 16, wherein, in the engaged state, a centrifugal force radially expands the segmented ring, and the centrifugal force exceeds the radially inward force of the resilient element.

18. The clutch assembly of claim 16, wherein, in the engaged state, a pressure-actuated system radially expands the segmented ring, and the pressure-actuated system is configured to exert a radially outward force on the segmented ring that exceeds the radially inward force of the resilient element.

19. The clutch assembly of claim 11, wherein the segmented ring is divided into a plurality of arc-shaped segments.

20. A clutch assembly comprising:

an inner race;

an outer race disposed concentrically around the inner race;

a plurality of sprags circumferentially disposed in an annular space between the inner race and the outer race, each of the plurality of sprags comprising a radially inner step and a radially outer step; and a segmented ring disposed circumferentially around the inner race, wherein the segmented ring is configured to radially expand for engagement with the radially outer step of each of the plurality of sprags and radially contract for engagement with the radially inner step of each of the plurality of sprags, wherein, in a disengaged state of the clutch assembly, the segmented ring radially contracts to exert a radially inward pressure on the radially inner step of each of the plurality of sprags and pivots each of the plurality of sprags to create a gap between each of the plurality of sprags and the outer race, and wherein, in an engaged state of the clutch assembly, the segmented ring radially expands to exert radially outward pressure on the radially outer step of each of the plurality of sprags and pivots each of the plurality of sprags to wedge each of the plurality of sprags between the inner race and the outer race.

* * * * *